United States Patent
Motooka et al.

(10) Patent No.: US 10,126,179 B2
(45) Date of Patent: Nov. 13, 2018

(54) TEMPERATURE SENSOR AND MANUFACTURING METHOD THEREFOR

(71) Applicant: Panasonic Intellectual Property Management Co., Ltd., Osaka (JP)

(72) Inventors: Toshiya Motooka, Nara (JP); Masaki Kita, Kyoto (JP); Hiroshi Shigemura, Kyoto (JP); Yasurou Kurahara, Hyogo (JP); Seiji Tamura, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 15/022,924

(22) PCT Filed: Sep. 18, 2014

(86) PCT No.: PCT/JP2014/004806
§ 371 (c)(1),
(2) Date: Mar. 17, 2016

(87) PCT Pub. No.: WO2015/056404
PCT Pub. Date: Apr. 23, 2015

(65) Prior Publication Data
US 2016/0209277 A1    Jul. 21, 2016

(30) Foreign Application Priority Data
Oct. 15, 2013    (JP) .................................. 2013-214489

(51) Int. Cl.
*G01K 7/00* (2006.01)
*G01K 7/22* (2006.01)
*G01K 1/08* (2006.01)

(52) U.S. Cl.
CPC ................ *G01K 7/22* (2013.01); *G01K 1/08* (2013.01)

(58) Field of Classification Search
USPC .......................................... 374/208
See application file for complete search history.

(56) References Cited

U.S. PATENT DOCUMENTS

| 6,573,644 | B1 | 6/2003 | Minami et al. |
| 2004/0264544 | A1* | 12/2004 | Fischer ................ G01K 7/16 374/208 |

(Continued)

FOREIGN PATENT DOCUMENTS

| JP | 63-033632 A | 2/1988 |
| JP | 8-159881 | 6/1996 |

(Continued)

OTHER PUBLICATIONS

Katsuaki, Yasui; Takanori, Shibahara; translation of JPH08327464.*

(Continued)

*Primary Examiner* — Lisa Caputo
*Assistant Examiner* — Nasir U Ahmed
(74) *Attorney, Agent, or Firm* — McDermott Will & Emery LLP

(57) ABSTRACT

A temperature sensor includes a detector and a first mold-resin body. The detector includes: a temperature sensing element which is disposed at a first end part of the detector, a terminal which is disposed at a second end part of the detector, and a lead wire for coupling the temperature sensing element to the terminal. The first mold-resin body covers the temperature sensing element, a portion the terminal, and the lead wire. The temperature sensor further includes a second mold-resin body which covers an another portion of the terminal and the first mold-resin body; the another portion of the terminal is exposed from the first mold-resin body. Then, a gate mark is formed on a surface of the second mold-resin body; the surface faces a side of the first end part.

3 Claims, 9 Drawing Sheets

(56) References Cited

U.S. PATENT DOCUMENTS

| | | | | |
|---|---|---|---|---|
| 2007/0063212 A1* | 3/2007 | Watanabe | ........... | H01S 5/02244 |
| | | | | 257/99 |
| 2009/0117401 A1* | 5/2009 | Naritomi | ................. | B29C 45/14 |
| | | | | 428/545 |
| 2011/0140591 A1* | 6/2011 | Lee | ..................... | H01L 25/0753 |
| | | | | 313/318.05 |
| 2012/0184120 A1* | 7/2012 | Basta | ..................... | A61B 5/746 |
| | | | | 439/213 |

FOREIGN PATENT DOCUMENTS

| | | |
|---|---|---|
| JP | 8-327464 | 12/1996 |
| JP | 9-218112 | 8/1997 |
| JP | 10-300589 | 11/1998 |
| JP | 2000-133161 | 5/2000 |
| JP | 2000-321147 | 11/2000 |
| JP | 2010-008366 | 1/2010 |

OTHER PUBLICATIONS

International Search Report of PCT application No. PCT/JP2014/004806 dated Dec. 9, 2014.
English Translation of Chinese Search Report dated Jan. 10, 2018 for the related Chinese Patent Application No. 201480056564.5.

* cited by examiner

TEMPERATURE SENSOR AND MANUFACTURING METHOD THEREFOR

CROSS-REFERENCE TO RELATED APPLICATIONS

This application is a U.S. national stage application of the PCT International Application No. PCT/JP2014/004806 filed on Sep. 18, 2014, which claims the benefit of foreign priority of Japanese patent application 2013-214489 filed on Oct. 15, 2013, the contents all of which are incorporated herein by reference.

TECHNICAL FIELD

The present invention relates to temperature sensors in each of which a temperature sensing element is covered with a mold resin body, and to methods of manufacturing the sensors.

BACKGROUND ART

A temperature sensor which includes a temperature sensing element covered with a mold resin body is configured as follows. The temperature sensing element such as a thermistor and terminals are connected to each other with lead wires to form a detector. The detector is molded to be buried in a resin case. With such a temperature sensor, in which the temperature sensing element is covered with the mold resin body, position of the temperature sensing element inside the resin case has a great influence on its detection accuracy of temperature. Therefore, it is important to increase positional accuracy of the temperature sensing element.

Patent Literatures 1 to 3 have been known to be aimed at increasing the positional accuracy of a temperature sensing element.

The configuration of the temperature sensor of Patent Literatures 1 is shown in FIG. 7. Resin case 1 has an opening into which detector 5 is inserted, with the detector being configured with temperature sensing element 2, terminals 3, and lead wires 4. Then, the opening is filled with mold resin 6 to integrate detector 5, resin case 1, and mold resin 6.

The configuration of the temperature sensor of Patent Literatures 2 is shown in FIG. 8. Lead wires 4 are covered with insulating resin 7.

The configuration of the temperature sensor of Patent Literatures 3 is shown in FIG. 9. Detector 5 is configured with temperature sensing element 2, terminals 3, and lead wires 4. When the detector is molded, temperature sensing element 2 is subjected to positioning by using locating pin 8.

CITATION LIST

Patent Literatures

PTL 1: Japanese Patent Unexamined Publication No. H10-300589
PTL 2: Japanese Patent Unexamined Publication No. H09-218112
PTL 3: Japanese Patent Unexamined Publication No. 2000-321147

SUMMARY OF THE INVENTION

One aspect of the present invention provides a temperature sensor which includes a detector, a first mold-resin body, and a second mold-resin body. The detector includes: a temperature sensing element which is disposed at a first end part of the detector, a terminal which is disposed at a second end part of the detector, and a lead wire for coupling the temperature sensing element to the terminal. The first mold-resin body covers the temperature sensing element, a portion of a terminal, and the lead wire. The second mold-resin body covers an another portion of the terminal and the first mold-resin body; the another portion of the terminal is exposed from the first mold-resin body. Then, a gate mark is formed on a surface of the second mold-resin body; the surface of the second mold-resin body faces a side of the first end part.

The configuration described above allows suppression of variations in detection accuracy of the temperature sensors.

Moreover, another aspect of the present invention provides a method of manufacturing a temperature sensor, the method including a first, second, and third steps. The first step is coupling a temperature sensing element to a terminal with a lead wire to form a detector. The second step is forming a first mold-resin body which covers the temperature sensing element, a portion of the terminal, and the lead wire. The third step is forming a second mold-resin body which covers an another portion of the terminal and the first mold-resin body; the another portion of the terminal is exposed from the first mold-resin body. In the third step, a mold resin is charged into a molding die along a first direction from the first end part where the temperature sensing element is disposed toward the second end part where a coupler part is disposed.

The configuration described above allows the manufacturing of temperature sensors with reduced variations in their detection accuracy.

DESCRIPTION OF EMBODIMENT

Prior to descriptions of embodiment, there will be described problems of the conventional temperature sensors which have been described with reference to FIGS. 7 to 9.

Progress has recently been achieved in compact-size and high-accuracy of temperature sensors which each have a temperature sensing element covered with a mold resin body. However, in the conventional temperature sensors described above, such a temperature sensing element is difficult to position stably in place.

Figure 7:
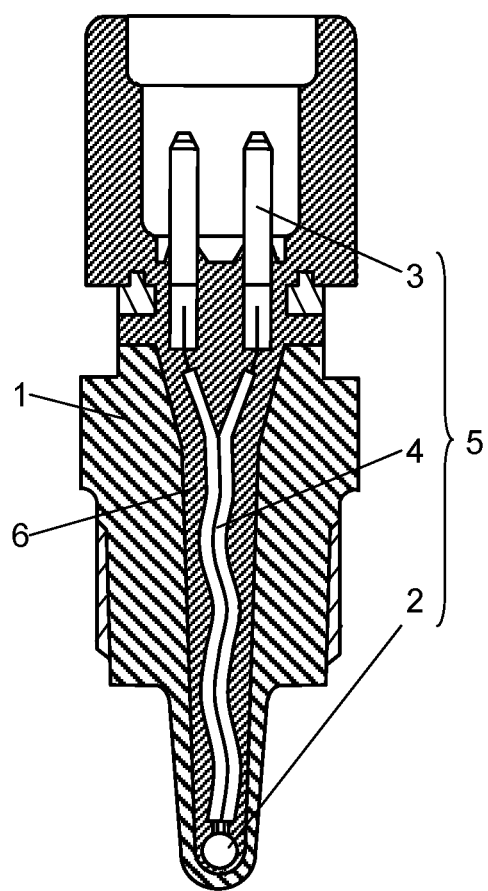
FIG. 7 is a cross-sectional view of a conventional temperature sensor.

In the conventional temperature sensor shown in FIG. 7, temperature sensing element 2 disposed in the inside of resin case 1 is supported only with lead wires 4. Accordingly, when mold resin 6 is charged into resin case 1, the flowing of mold resin 6 influences the position of temperature sensing element 2 disposed inside the opening of resin case 1, resulting in an unstable positioning of the element.

Figure 8:
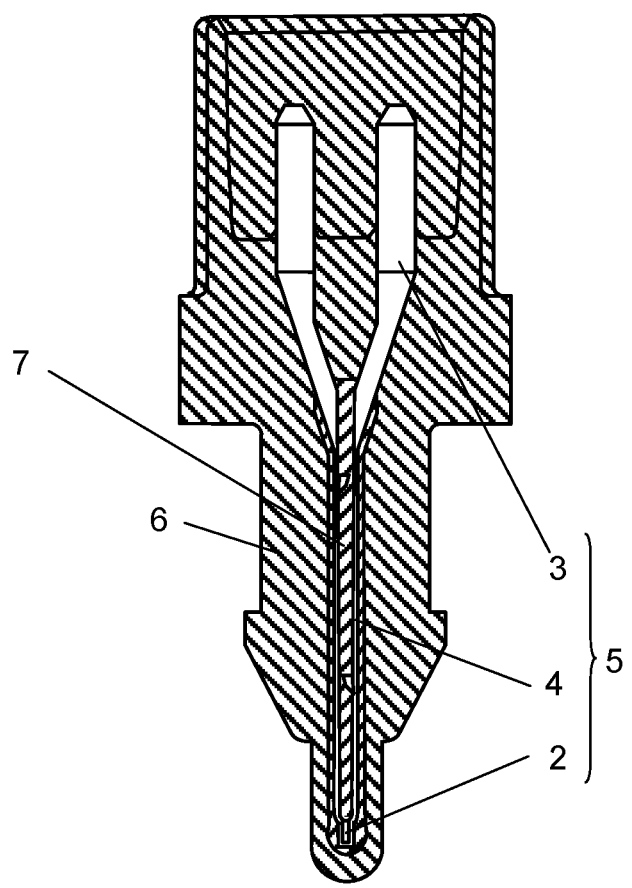
FIG. 8 is a cross-sectional view of another conventional temperature sensor.

In the conventional temperature sensor shown in FIG. 8, lead wires 4 are covered with insulating resin 7 to reinforcing lead wires 4 against the flowing of mold resin 6. Unfortunately, a sufficiently strong reinforcement of lead wires 4 requires thicker insulating resin 7. Such a large thickness of insulating resin 7 results in a decrease in sensitivity of temperature sensing element 2.

Figure 9:
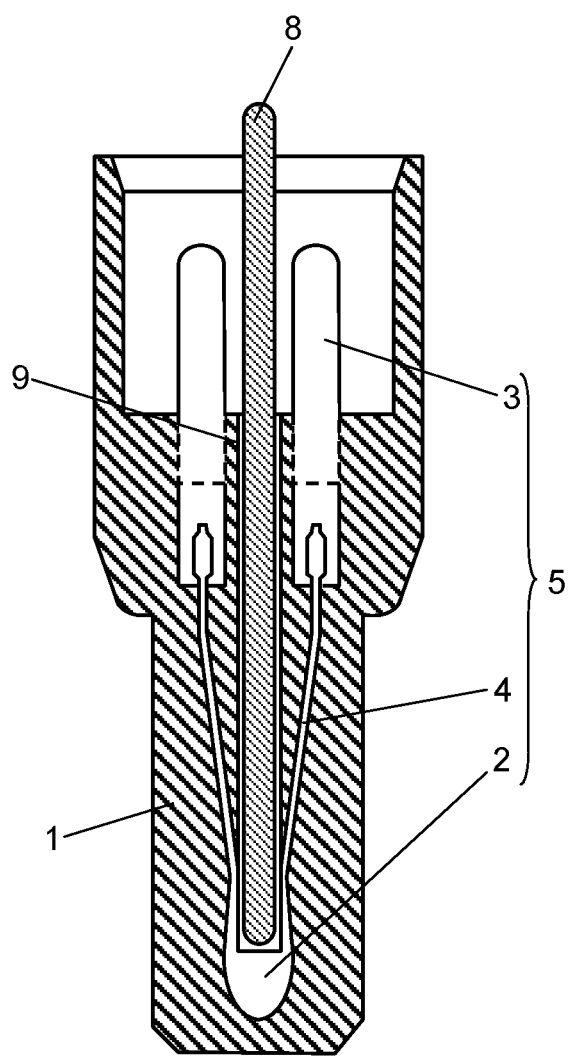
FIG. 9 is a cross-sectional view of yet another conventional temperature sensor.

In the conventional temperature sensor shown in FIG. 9, temperature sensing element 2 is positioned by using locating pin 8. The use of locating pin 8 requires jig hole 9 that is formed in resin case 1, which makes it difficult to reduce the size of the temperature sensor.

EXEMPLARY EMBODIMENT

Configuration of Temperature Sensor

Hereinafter, descriptions of the embodiment of the present invention will be made with reference to the accompanying drawings.

Figure 1:
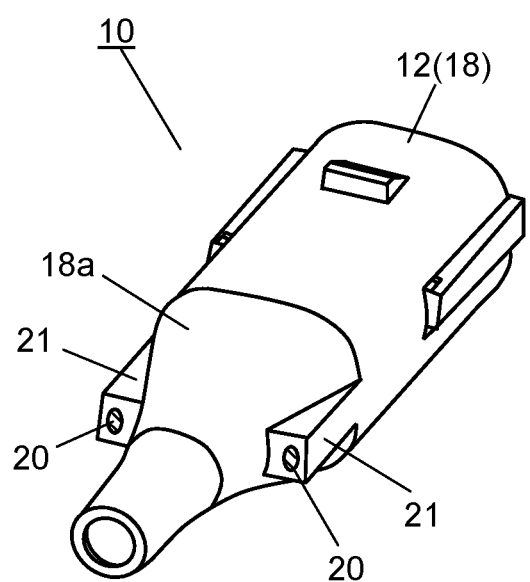
FIG. 1 is a perspective view of a temperature sensor according to an embodiment of the present invention.
Figure 2:
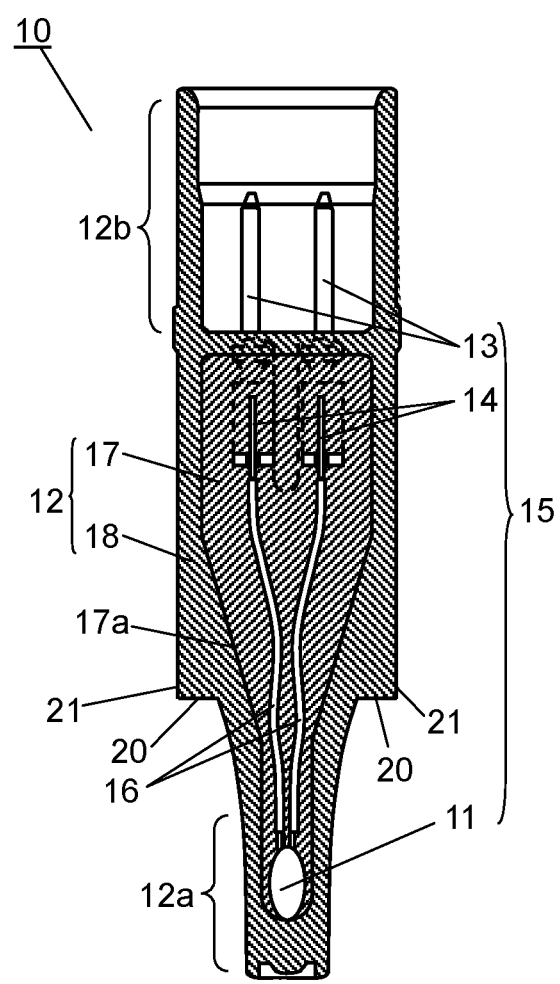
FIG. 2 is a cross-sectional view of the temperature sensor according to the embodiment of the invention.

FIG. 1 is a perspective view of temperature sensor 10. FIG. 2 is a cross-sectional view of temperature sensor 10. In temperature sensor 10 according to the embodiment, temperature sensing element 11 is a glass-sealed thermistor element. Then, temperature sensing element 11 is buried in resin case 12. Moreover, the front end part (first end part) of case 12 is configured to be temperature sensing part 12a. In the inside of temperature sensing part 12a, temperature sensing element 11 is disposed. In the rear end part (second end part) of case 12, coupler part 12b is formed which is intended to make an external coupling. In the inside of coupler part 12b, metal terminals 13 are disposed to make the electrical coupling with the outside. Then, a portion of each of terminals 13 is exposed from case 12. Moreover, temperature sensing element 11 is electrically coupled with terminals 13 via lead wires 14.

That is, the temperature sensor according to the embodiment includes detector 15 including: temperature sensing element 11 disposed in the first end part of the detector, terminal 13 disposed in the second end part of the detector, and lead wire 14 that couples temperature sensing element 11 to terminal 13. The temperature sensor according to the embodiment further includes first mold-resin body 17 that covers temperature sensing element 11, a portion of terminal 13, and lead wire 14. In addition, the temperature sensor according to the embodiment yet further includes second mold-resin body 18 that covers an another part of terminal 13 and first mold-resin body 17: the another part of terminal 13 exposed from first mold-resin body 17. Then, the surface, on which gate mark 20 have been formed of second mold-resin body 18, faces a side of the first end part.

Method of Manufacturing Temperature Sensor

Next, descriptions will be made regarding a method of manufacturing temperature sensor 10 with reference to FIGS. 3A to 3C.

Figure 3A:
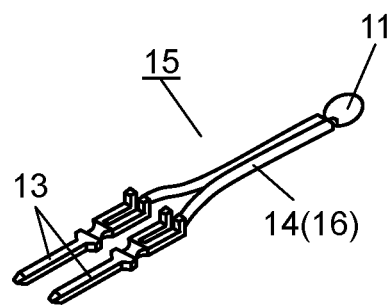
FIG. 3A is a schematic view illustrating a method of manufacturing the temperature sensor according to the embodiment of the invention.

As shown in FIG. 3A, temperature sensing element 11 is coupled with a pair of terminals 13 by using lead wires 14 to form detector 15 (one example of the first step). Note that, a pair of lead wires 14 is respectively inserted into insulating tubes 16 to prevent the wires from making a short circuit.

Figure 3B:
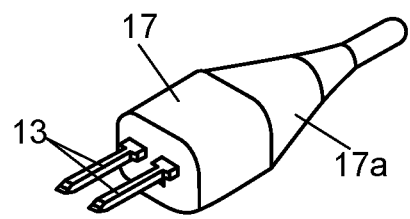
FIG. 3B is a schematic view illustrating the method of manufacturing the temperature sensor according to the embodiment of the invention.

Next, as shown in FIG. 3B, first mold-resin body 17 is molded to form detector 15. Note that first mold-resin body 17 is molded such that a portion of each of terminals 13 is exposed from first mold-resin body 17. That is, first mold-resin body 17 covers temperature sensing element 11, another portion of each of terminals 13, and lead wires 14 (one example of the second step).

Figure 3C:
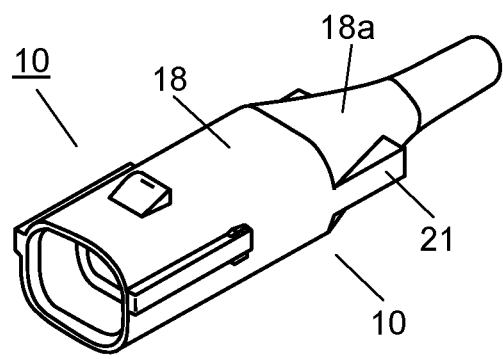
FIG. 3C is a schematic view illustrating the method of manufacturing the temperature sensor according to the embodiment of the invention.

Moreover, as shown in FIG. 3C, second mold-resin body 18 is molded to cover the surface of first mold-resin body 17. Note that second mold-resin body 18 is molded such that the end portion of each of terminals 13 is exposed from second mold-resin body 18. Second mold-resin body 18 covers first mold-resin body 17 and a part of a remaining portion of each of terminals 13, with the remaining portion being the portion exposed from first mold-resin body 17 (one example of the third step).

That is, the method of manufacturing the temperature sensor according to the embodiment includes the first step of coupling temperature sensing element 11 to terminals 13 by using lead wires 14 to form the detector. Moreover, the method of manufacturing the temperature sensor according to the embodiment includes the second step of molding first mold-resin body 17 to cover temperature sensing element 11, the portion of each of terminals 13, and lead wires 14. Furthermore, the method of manufacturing the temperature sensor according to the embodiment includes the third step of molding second mold-resin body 18 to cover first mold-resin body 17 and the portions of the remaining portion of each of terminals 13, with the remaining portion being exposed from first mold-resin body 17.

Then, in the third step, the mold resin is charged into a molding die along a first direction from the first end part at which temperature sensing element 11 is disposed to the second end part at which coupler part 121) is disposed.

As described above, temperature sensor 10 is formed.

Here, descriptions will be made regarding advantageous effects of temperature sensor 10 that is manufactured as described above.

The molding of detector 15 with first mold-resin body 17 allows the following effects.

Lead wires 14 are used to couple temperature sensing element 11 to terminals 13 to form detector 15, resulting in a low strength of detector 15 prior to being molded with first mold-resin body 17. For this reason, when detector 15 is molded with first mold-resin body 17, the position of temperature sensing element 11 becomes unstable inside the molding die (not shown) due to the flowing of the mold resin. In some cases, the molding is made with temperature sensing element 11 being in contact with the surface of the molding die (not shown). This results in an unfavorable exposure of temperature sensing element 11 from the surface of first mold-resin body 17.

On the other hand, in temperature sensor 10, the surface of first mold-resin body 17 is covered with second mold-resin body 18. Accordingly, even in the case where temperature sensing element 11 is exposed from the surface of first mold-resin body 17, the element is prevented from exposing from second mold-resin body 18, thereby sufficiently holding the airtightness of temperature sensing element 11.

The following configuration is responsible for this. That is, detector 15, in which temperature sensing element 11 has been coupled to terminals 13 using lead wires 14, is covered with first mold-resin body 17, so that the thus-covered detector exhibits an increased stiffness. Then, this stiffness prevents detector 15 from being moved out of position due to the flowing of the mold resin inn the third step of molding the detector with second mold-resin body 18.

Note that, in temperature sensor 10, the whole of detector 15 is covered with first mold-resin body 17, except for the exposed portions of terminals 13. If the resin of temperature sensing part 12*a* is made thick, it increases heat capacity of the surrounding of temperature sensing element 11, resulting in a reduced detection sensitivity of temperature sensor 10. Thus, the resin of temperature sensing part 12*a* can be made thin to increase the detection sensitivity of temperature sensing element 11.

Note that, such a reduced thickness of the resin in the vicinity of temperature sensing part 12*a* allows reduced variations in flowability of the mold resin when second mold-resin body 18 is molded. Such reduced variations in flowability prevent detector 15 from being moved out of position due to the flowing of the mold resin. This can further increase the detection accuracy of temperature sensor 10. Note that, in cases where the material of first mold-resin body 17 is the same as that of second mold-resin body 18 and is polybutylterephthalate (PBT), first mold-resin body 17 and second mold-resin body 18 are welded to each other at the interface therebetween in the molding processing. This configuration allows an increased airtightness of the interface between first mold-resin body 17 and second mold-resin body 18.

Method of Molding Second Mold-Resin Body 18

Next, further descriptions will be made in more detail regarding a method of molding second mold-resin body 18, with reference to FIG. 4.

Figure 4:
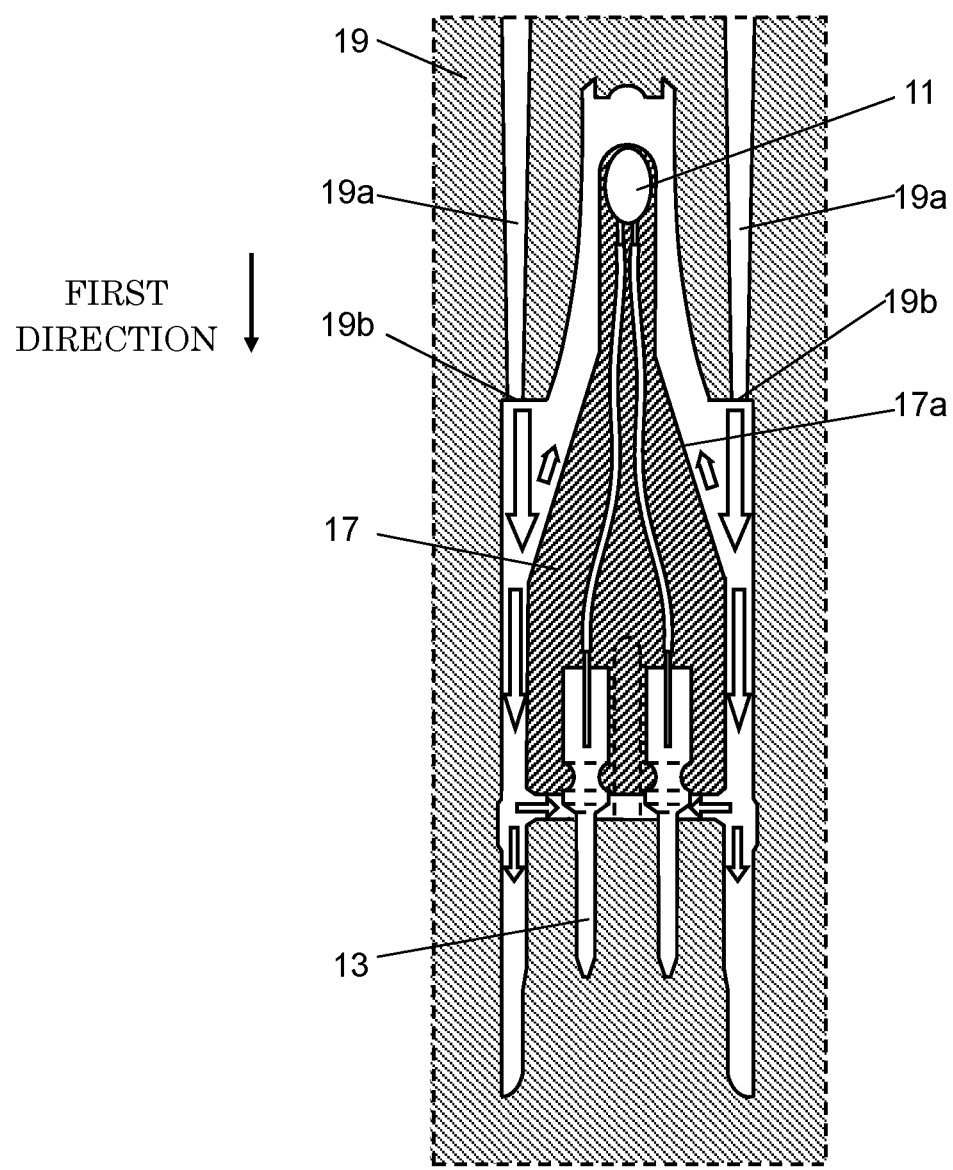
FIG. 4 is a schematic view illustrating flowing of a mold resin according to the embodiment.

Note that, FIG. 4 shows the state in which first mold-resin body 17 has already been molded, so that detector 15 except for the portions of terminals 13 is covered with first mold-resin body 17.

Molding die 19 includes gates 19*a* through which the mold resin flows in. The flowing of the mold resin, which flows in through gates 19*a*, is indicated by arrows shown at the inside of molding die 19 in the FIGURE.

The mold resin is charged to fill the inside of molding die 19 through gates 19*a* along the first direction from a side of the first end part (upper side in FIG. 4) where temperature sensing element 11 is disposed to a side of the second end part (lower side in FIG. 4) where terminals 13 are disposed. The end part of each of terminals 13 is made not to be covered with second mold-resin body 18. So, such a part of terminal 13 to be exposed from second mold-resin body 18 is fitted and fixed with molding die 19.

Accordingly, when second mold-resin body 18 is molded, the mold-resin body is charged into the die, starting with the rear end-part side (lower side in FIG. 4) of first mold-resin body 17 that is supported by molding die 19. This prevents the front end part, where temperature sensing element 11 is disposed, of first mold-resin body 17 from being moved out of position due to the flowing of the mold resin. That is, it is possible to increase the positional accuracy of first mold-resin body 17 that has temperature sensing element 11, in the inside of second mold-resin body 18. As a result, this allows easy volume-manufacturing of temperature sensors 10 with high detection accuracy.

Note that, when the charging of the mold resin is started with the rear end-part side of first mold-resin body 17, where terminals 13 are disposed on the rear end-part side, some of the mold resin comes into below first mold-resin body 17, which causes a push-up force.

Such a push-up force is one which acts toward the direction in which terminals 13 can be pulled out from molding die 19. That is, the push-up force pushes up first mold-resin body 17 toward the front end-part side (upper side in FIG. 4). If first mold-resin body 17 is displaced toward the front end-part side (upper side in FIG. 4), it causes variations in distance from the front end of second mold-resin body 18 (not shown in FIG. 4) to temperature sensing element 11, resulting in a possible influence on the detection accuracy of temperature sensor 10. Fortunately, the mold resin which flows in from the front end-part side (upper side in FIG. 4) toward the rear end-part side (lower side in FIG. 4) causes a push-down force that acts on first mold-resin body 17. Thus, this push-down force can suppress the influence of the push-up force described above.

Shape of Second Mold-Resin Body

Next, descriptions will be made regarding the configurations of gates 19*a* of molding die 19 and gate marks 20 of second mold-resin body 18, with reference to FIGS. 1, 2, and 4.

As described above, in temperature sensor 10 as shown in FIG. 1, gate marks 20 are formed on gate projection parts 21 when second mold-resin body 18 is molded. Then, as can be seen from FIGS. 1 and 2, second slope surface 18*a* of second mold-resin body 18 is along first slope surface 17*a* of first mold-resin body 17. Moreover, gate projection parts 21 are formed on second slope surface 18*a*; gate marks 20 are formed on gate surface 19*b*. These configurations are intended to increase the detection accuracy of temperature sensor 10 (i.e., positional accuracy of temperature sensing element 11 in case 12).

As shown in FIG. 4, the flowing of the mold resin comes into contact with first slope surface 17*a*, with the flowing coming from the front end-part side (upper side in FIG. 4) through gates 19*a* into the inside of molding die 19. A pushing-down force is caused when the mold resin comes into contact with first slope surface 17*a*, which efficiently acts as the pushing-down force described above.

Note that the pushing-down force can be adjusted by adjusting the inclination of the slope of first slope surface 17*a* relative to gate marks 20.

Moreover, in cases where gate projection parts 21 are not formed on second slope surface 18*a*, the portions for gate marks 20 to be formed thereon are disposed directly on second slope surface 18*a*. This causes molding die 19 to have the following shape. That is, the angle becomes smaller between gate surfaces 19*b* and the direction (first direction) in which gates 19*a* extend. Such a smaller angle requires narrow-angled portions of molding die 19, resulting in a decreased strength of the narrow-angled portions. Therefore, when the lifetime of molding die 19 is taken into consideration, gate surfaces 19*b* are preferably perpendicular to the direction (first direction) in which gates 19*a* extend.

In the embodiment, gate projection parts 21 are disposed which protrude from second slope surface 18*a*. Then, gate marks 20 are formed on the end surfaces of gate projection parts 21. Therefore, as shown in FIG. 4, the presence of gate projection parts 21 allows gate surface 19*b* to be perpendicular to the direction (first direction) in which gates 19*a* extend, independently of the inclination of second slope surface 18a. This allows improved durability of molding die 19 used to mold the second mold-resin body.

Configuration of Holes of First Mold-Resin Body 17

Next, a preferable configuration of holes in first mold-resin body 17 will be described with reference to FIGS. 5 and 6.

Figure 5:
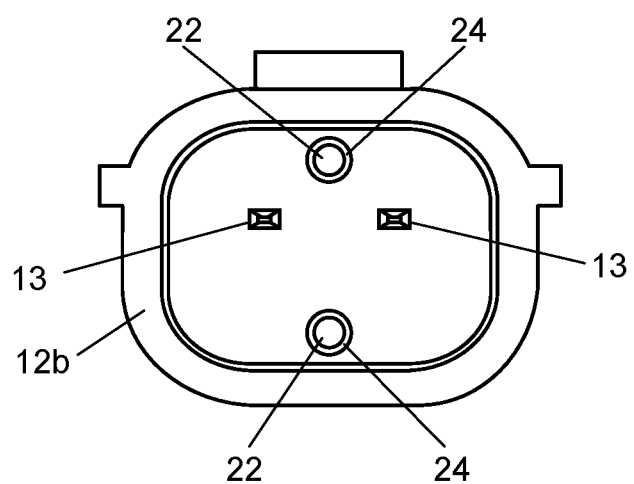
FIG. 5 is a plan view of the temperature sensor according to the embodiment.

FIG. 5 is a plan view of coupler part 12b as viewed from the direction in which terminals 13 extend. FIG. 6 is a partial cross-sectional view of one of holes 22 formed in coupler part 12b of first mold-resin body 17.

As shown in FIG. 5, terminals 13 are exposed from second mold-resin body 18. Moreover, on the inside periphery of hole 22, protrusions 24 are formed.

Figure 6:
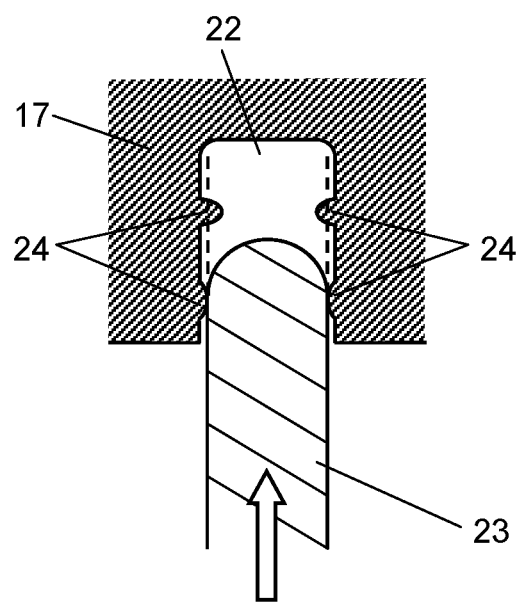
FIG. 6 is a partial cross-sectional view of a hole in first mold-resin body 17 according to the embodiment.

FIG. 6 shows the state after the molding of first mold-resin body 17 and prior to the molding of second mold-resin body 18.

Each of holes 22 is one which is fitted onto corresponding support pin 23 disposed in molding die 19 in order to support first mold-resin body 17 when second mold-resin body 18 is molded. That is, as described referring to FIG. 4, the molding process of second mold-resin body 18 adopts the means for suppressing the push-up force acting on first mold-resin body 17. Such means include: the configuration in which terminals 13 are fitted and fixed with molding die 19, and the action of the flowing of the mold resin on first mold-resin body 17. In addition to the means described above, holes 22 are disposed to fit onto support pins 23, which allows a further suppression of the pushing-up action on first mold-resin body 17 when second mold-resin body 18 is molded.

It is noted, however, that, when support pins 23 are inserted into holes 22 disposed in first mold-resin body 17, variations in lengths by which support pins 23 are inserted result in variations in positions of temperature sensing elements 11. Therefore, it is important to make the insertion lengths uniform. Thus, the diameter of holes 22 is determined, through offset setting, to be larger than the diameter of support pins 23. Then, a plurality of protrusions 24, which protrude inward, is disposed on portions of the inner peripheral surface of each of holes 22. Upon insertion of support pin 23, each of protrusions 24 is subjected to deformation by pressure-contact, thereby supporting support pin 23 in the pressure-contact state.

With the configuration described above, when support pin 23 is pressed to fit into hole 22, the deformed-by-pressure-contact portions of protrusions 24 can be accommodated in the offset region between support pin 23 and hole 22. This allows prevention of the deformed-by-pressure-contact portions from becoming obstacles to the insertion of support pin 23, resulting in the uniform lengths by which support pins 23 are inserted. Moreover, each of the protrusions inside hole 22 is preferably formed in a ring shape along the circumferential direction of the inner peripheral surface of hole 22. Furthermore, a plurality of ring-shaped protrusions 24 per hole is preferably disposed.

INDUSTRIAL APPLICABILITY

The present invention provides the advantageous effect of suppressing variations in detection accuracy of temperature sensors, and is particularly effective for a vehicle-installed temperature sensor to sense atmospheric temperature.

REFERENCE MARKS IN THE DRAWINGS 10 temperature sensor
11 temperature sensing element
12b coupler part
13 terminal
14 lead wire
15 detector
17 first mold-resin body
17a first slope surface
18 second mold-resin body
18a second slope surface
19 molding die
19a gate
19b gate surface
20 gate mark
21 gate projection part
22 hole
24 protrusion

The invention claimed is:

1. A temperature sensor comprising:
a detector including:
    a temperature sensing element disposed at a first end part;
    a terminal disposed at a second end part; and
    a lead wire coupling the temperature sensing element to the terminals;
a first mold-resin body covering the temperature sensing element, a portion of the terminal, and the lead wire; and
a second mold-resin body covering an another portion of the terminal and the first mold-resin body, the another portion of the terminal being exposed from the first mold-resin body, wherein:
a gate mark is formed on a surface of the second mold-resin body and the surface on which the gate mark is formed faces a side of the first end part,
the first mold-resin body includes a first slope surface expanding from the first end part toward the second end part,
the second mold-resin body includes a second slope surface along the first slope surface, and a gate projection part protruding from the second slope surface toward the first end part, and
the gate mark is formed on the gate projection part.

2. The temperature sensor according to claim 1,
wherein a hole is disposed in a surface of the first mold-resin body, the surface of the first mold-resin body facing the second end part, and
a protrusion is disposed on an inner peripheral surface of the hole of the first mold-resin body.

3. The temperature sensor according to claim 2, wherein the protrusion has a ring shape along the inner peripheral surface of the hole.

* * * * *